United States Patent [19]

Moellenbeck

[11] Patent Number: 4,921,604

[45] Date of Patent: May 1, 1990

[54] UPFLOW BIOLOGICAL REATOR WASTE WATER TREATMENT SYSTEM

[75] Inventor: Albert J. Moellenbeck, Sante Fe, N. Mex.

[73] Assignee: Biotech Industries Incorporated, Wyckoff, N.J.

[21] Appl. No.: 326,272

[22] Filed: Mar. 21, 1989

[51] Int. Cl.⁵ .............................................. B01D 33/34
[52] U.S. Cl. ................................ 210/151; 210/221.2; 210/617; 210/620
[58] Field of Search ............ 210/150, 151, 220, 221.1, 210/221.2, 615, 616, 617, 620, 629, 607, 610, 612, 614

[56] References Cited

U.S. PATENT DOCUMENTS

| | | | |
|---|---|---|---|
| 3,269,542 | 8/1966 | Renzi et al. | 210/615 |
| 3,371,033 | 2/1968 | Simmons et al. | 210/615 |
| 3,773,659 | 11/1973 | Carlson et al. | 210/620 |
| 3,773,660 | 11/1973 | Hopwood | 210/151 |
| 4,192,742 | 3/1980 | Bernard et al. | 210/617 |
| 4,351,729 | 9/1982 | Witt | 210/617 |
| 4,469,599 | 9/1984 | Gros et al. | 210/150 |
| 4,554,078 | 11/1985 | Huggins et al. | 210/150 |
| 4,561,974 | 12/1985 | Bernard et al. | 210/617 |
| 4,582,600 | 4/1986 | Atkinson et al. | 210/151 |
| 4,599,174 | 7/1986 | McDowell | 210/615 |

Primary Examiner—W. Gary Jones
Assistant Examiner—Cynthia L. Nessler
Attorney, Agent, or Firm—W. Patrick Quast

[57] ABSTRACT

Improvements to an upflow biological reactor (UBR) waste water treatment system include preoxygenating the waste water in a separate vessel before submitting the preoxygenated waste to the biological reaction tower. A unique distribution means is described which maximizes the distribution of the preoxygenated waste across the cross-sectional area of the UBR tower. This results in an optimization of the reaction process between the bacteria culture in the tower and the contaminants contained in the waste water. Anaerobic conditions are thus inhibited and to a large extent, eliminated. Further, the invention provides for a "polishing" system which permits for maximum elimination of the contaminant by bubbling through any remaining oxygen containing air after the process in the UBR tower is complete. Further, this polishing system eliminates the need for a separate condensation foam retrieval system, since collected foam after the UBR tower process is completed, is likewise directed through the effluent where it is condensed and becomes part of the effluent liquid.

5 Claims, 2 Drawing Sheets

UPFLOW BIOLOGICAL REATOR WASTE WATER TREATMENT SYSTEM

FIELD OF THE INVENTION

This invention relates to improvements to a biological treatment system for waste water, and particularly, improvements to a fixed-film upflow biological reactor system.

BACKGROUND OF THE INVENTION

Traditionally, there have been two types of biological systems which have been used to remove organic contaminants from waste waters. These are the fixed-film system, and the suspended growth, or activated sludge system. Each of these systems has their advantages and disadvantages which result in their being specifically used for different applications.

For example, the fixed-film systems are proven more effective than the activated sludge systems in handling hydraulic and organic shock loads. This is principally because the bacteria can affix themselves to the medium in a protective layer and propagate to provide an active biological system on the surface of the layer. On the other hand, the activated sludge systems are highly efficient on consistent waste water flows. However, they are very sensitive to hydraulic and organic loading changes.

The upflow biological reactor system combines the benefits of both a fixed-film system for toxic and hard to biodegrade materials and a suspended growth system for total breakdown of organic wastes.

Generally, such biological reactor systems comprise an influent or waste holding tank; nutrient feed system; the actual upflow aerobic biological reactor tower; and an effluent or settling tank.

The purpose of the present invention is to optimize the performance of an upflow biological reactor (UBR) system by making various improvements thereto which will permit it to perform more efficiently. Towards that end, the present invention proposes to first of all preoxygenate the waste water, enriching it with dissolved oxygen prior to its entry into the biological reactor tower. A unique apparatus to accomplish this is disclosed.

Further, the proposed improvement includes a unique distributing means disposed at the base of the biological reactor tower for delivering the preoxygenated waste water evenly across the entire horizontal cross-sectional area of the UBR. The improved distribution means inhibits the development of anaerobic conditions in the tower; and inhibits the crystallization or solidification of the waste in the UBR.

Further, the improved treatment system includes means for utilizing the oxygen which remains in the discharge air of the UBR for further oxygenation of any remaining waste in the system effluent tank. In addition, this part of the improvement to the treatment system provides for the condensation and containment of any foam which may be discharged from the UBR, and results in facilitating the agitation of the remaining waste so as to prevent it from going into an anaerobic state, thus preventing objectionable odors.

SUMMARY OF THE INVENTION

Towards the accomplishment of the improved efficiency of a biological reactor system, and towards the accomplishment of other objectives which will be more evident after a reading of the following description of the preferred embodiment, taken in conjunction with the accompanying drawings, there is disclosed an improved UBR type, waste water treatment system which includes an influent waste tank, an upflow biological reactor tower, and an effluent waste tank, comprising means for enriching the waste liquid contained in the influent waste tank with dissolved oxygen before supplying the waste liquid to the biological reactor tower. The preoxygenation enhances the biodegradation of organic wastes in the tower. Further, the improved system comprises an improved means for evenly distributing the dissolved oxygen enriched, preconditioned waste liquid in the UBR tower, which means includes a plurality of channels each having one open side and which are fixedly connected to the base of the UBR tower by leveling means. The open side of the channel means is disposed facing downward toward the base of the UBR tower.

A plurality of first pipe means is disposed beneath and coextensive with each of the channel means with each of the first pipe means including a number of orifices extending upward and into the open side of the corresponding channel means. Second pipe means which are adapted to receive the preconditioned waste liquid are connected to the first pipe means such that the preconditioned waste liquid which is received at the UBR tower is dispensed from the first pipe means via the orifices. The leveling means further includes adjusting means for adjusting the horizontal orientation of each of said channel means so that even distribution across the cross sectional area of the UBR tower, of the oxygen-enriched, preconditioned waste liquid exiting from the orifices, is achieved.

The system further includes means for directing compressed air, oxygen and foam which collects at the top of the UBR tower into the effluent waste tank. There it is dispersed through sparger pipe means positioned in the bottom of the effluent waste tank whereby the air, oxygen and foam are discharged into the liquid treated waste so that anaerobic conditions are inhibited, the waste material is further biodegraded and the foam condensed.

BRIEF DESCRIPTION OF THE DRAWINGS

A further appreciation of the objects set forth and a better understanding of the system and its operation will occur with a reading of the following description of the preferred embodiment considered together with the accompanying drawings. These are.

DESCRIPTION OF THE PREFERRED EMBODIMENT

Figure 1:
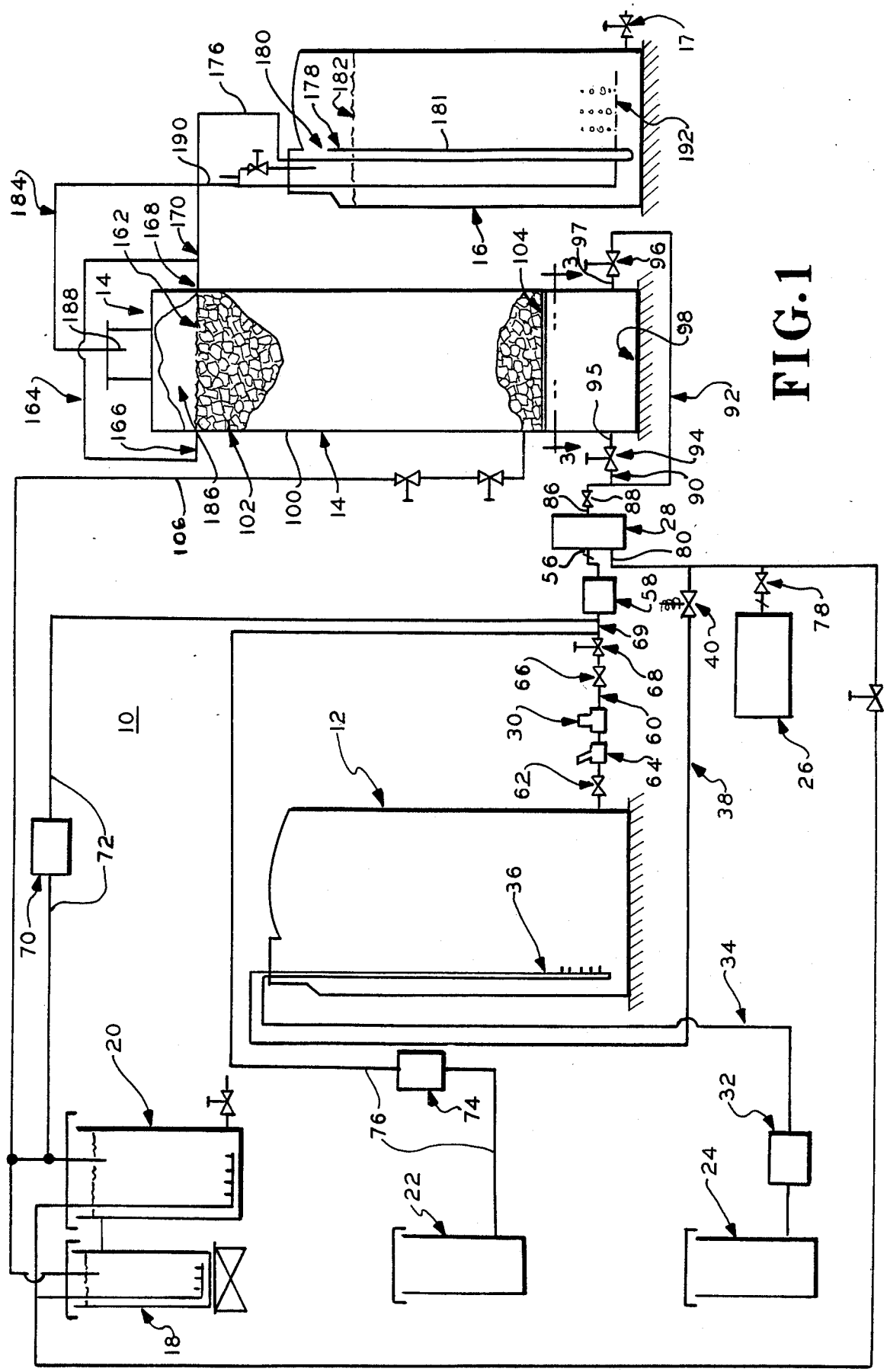
FIG. 1, which is a system diagram of the improved treatment system shown in schematic form.

Referring to FIG. 1 there is shown a waste water treatment system 10, which generally typifies an upflow biological reactor system, (hereinafter "UBR").

The system generally comprises an influent waste storage tank 12 which serially feeds the UBR tower 14. The latter in turn dispenses the treated waste water into the effluent waste tank 16, where the treated waste water is stored until disposed of via valve piping 17.

The waste water treatment system of the present invention further comprises an auxiliary fermenting system 18 and 20; a tank 22 containing the necessary nutrients on which the particular bacteria used thrive; a caustic solution tank 24; an air/oxygen supply means or compressor 26; and oxygenator means 28.

The influent waste tank 12 is the point of entry for the waste water to be treated. It is here that the contaminated liquid is first stored permitting equalization; and where, if necessary, analyses made to determine the nature of the organic contaminants; the ph factor; the presence of other contaminants which might inhibit the biological reaction process; as well as, permit the temperature adjustment of the waste water so as to provide a conducive environment in which the bacteria can thrive.

One of the primary functions of the influent waste tank is to permit an analysis of the ph factor of the contaminated waste liquid. In the biological reactive systems which are being considered here, it is important that the ph of the waste to be treated lie in a range between six and eight. In order to accomplish this, the treatment system includes a ph probe 30. Before the process is begun, as well as during the actual treatment cycle, the ph probe 30 samples the ph factor of the waste liquid exiting from the tank 12. The probe 30, when it senses the ph factor is below the indicated range, through a suitable control mechanism not shown, activates pump 32 to permit the addition of a caustic solution contained in tank 24 to enter the tank 12 via piping 34. Simultaneously, air is provided through perforated pipe 36 disposed in proximity to the exit orifice of pipe 34 positioned near the bottom of the tank 12, so as to permit "mixing" of the caustic solution with the contaminated waste. The air is supplied through pipe 38 which is connected to valve 40, which is open in response to the ph probe 30 detecting a low ph factor. Valve 40 in turn is connected to compressor 26. It is to be noted that an acidic solution can be used together with or in place of the caustic solution where the ph is found to be on the high side of the desired range.

Figure 2:
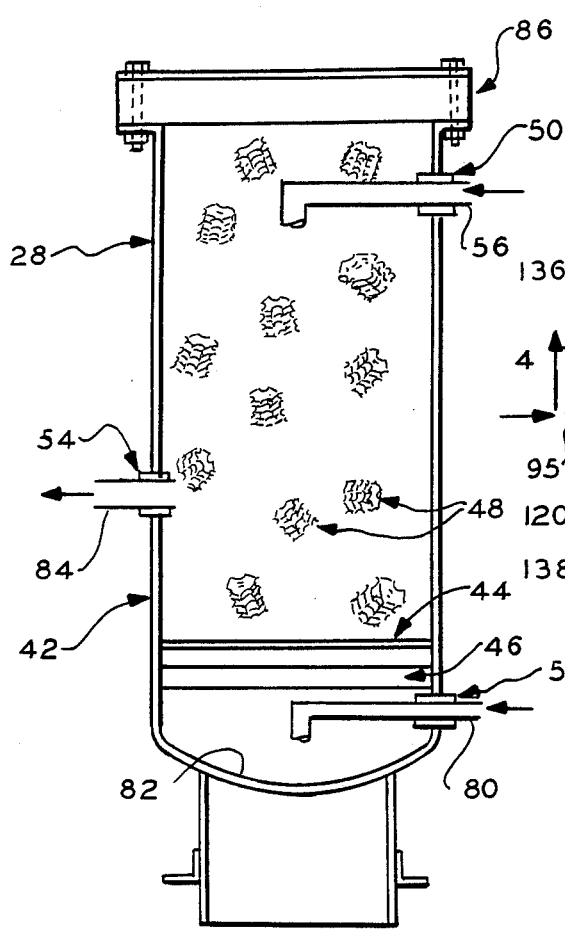
FIG. 2 is a schematic, sectional drawing of an element of the improved waste treatment system.

Referring to FIG. 2, the oxygenator is depicted. Typically, the pressure vessel is manufactured of carbon steel. It includes a container portion 42; a perforated screen 44 secured to the sides of the container portion and positioned on support ring 46, which is also secured to the sides of the container.

The oxygenator further includes column packing material 48. Although depicted schematically, the packing material or fill, fills up the container portion above the screen 44. Typical fill material is supplied in the United States by Jaeger Products, Inc., P.O. Box 1653, Spring, Tex. 77383. They are distributors of packing material used in the present invention, such as the hollow, slotted ring design including a network of rims, struts, and drip points, known in the industry as METAL VSP, a Registered Trademark of the German Company, VEREINIGTE FULLKORPER-FABRIKEN, GMBH+CO. Again, the column packing material fills the container above the screen 44.

Connected at the sides of the container portion 42 are three nozzle-type arrangements, 50, 52 and 54.

Nozzle-type arrangement 50 includes piping 56 which is connected in line with the influent waste tank 12 through feed pump 58 and piping system 60. The piping system 60 includes an in-line valve 62 which is serially connected to a strainer 64 which "protects" the ph probe 30 and feed pump 58.

The piping system 60 further includes valve 66 and line drain valve 68. Drain valve 68 is used during the process to sample the influent for composition, concentration and calibration of the ph probe. Connected to the serial piping system 60, downstream from valve 68, through suitable tee connectors is the auxiliary fermenter 18, via pump 70 and piping 72. Also connected to the serial pipe system 60 at this point, again through a suitable tee connection is the nutrient supply tank 22 via pump 74 and piping 76. Valve 62 and 66 permit the operator to close down the piping system 60 to permit cleaning and/or replacement of the strainer 64 or ph probe 30.

In operation, the prepared waste water stored in influent tank 12 is directed through the piping system 60 by feed pump 58 into pipe 56 at the top of the container 42. Air supply means (compressor) 26 provides compressed air through control valve 78. The compressed air enters the lower part of the container 82 via pipe 80, through nozzle-type arrangement 52.

Typically, the waste water enters the oxygenator 28 via pipe 56. The waste water trickles downward over the fill material 48. As the waste water passes through the screen 44 and begins to collect on the bottom 82 of the container, the compressed air entering the vessel via pipe 80 is reflected off of the bottom 82 upwards into the container volume. It carries any collected waste water from the bottom and throws it upward through the fill material 48. In time, a mist of waste water entrained in compressed air is created which is eventually vented from the oxygenator 28 via pipe 84 for processing in the UBR tower 14. This unique preoxygenation of the waste water with dissolved oxygen facilitates and assures a more expeditious biodegradation process within the UBR. With the high dissolved oxygen (DO) content, the waste water provides an enhanced environment which results in a vigorous interaction between the bacteria culture in the UBR and the waste water, organic impurities. The use of the fill material generally of sharp angular surfaces, with the compressed air being redirected therethrough, because of the relatively high contact surface area of waste water, permits a maximum absorption of DO by the waste water prior to its introduction to the UBR.

The oxygenator 28, as mentioned above, is a closed pressure vessel and includes a removable top member 86 for cleaning and replacement if necessary, of the fill material.

The entrained air/mist exiting the oxygenator 28 via pipe 84 is routed through piping system 86 to the UBR tower 14. Piping system 86 comprises a main control valve 88 which permits direct feeding of the UBR tower 14 along two piping paths, 90 and 92. Paths 90 and 92 each include valves 94 and 96 respectively. These control the feeding of the entrained waste water to opposite sides of the unique distribution system housed at the bottom of the UBR tower 14, which is depicted in detail in FIGS. 3, 4, 5 and 6. The distribution system at the bottom of the UBR tower 14 is fed the entrained waste water through pipes 95 and 97.

The UBR tower 14 comprises a base portion 98 and a tower portion 100. The tower portion is packed with a fill material 102, which typically is a plastic packing fill such as Jaeger Tri-Packs brand, hollow, plastic spherical column packing as described in U.S. Pat. No. 4,203,935. Jaeger Tri-Packs is a Registered Trademark of the aforementioned Jaeger Products, Inc. The fill material is packed in the tower above the screen mesh 104 (see FIG. 4).

The height, cross-sectional area of the tower and the selection of the fill material are functions of the system design and are determined in accordance with known criteria.

The vessel body of the UBR tower 14 is made of carbon steel.

Initially, the UBR tower 14 is filled partially with tap water, which is brought to an operating temperature essentially compatible with the temperature environment necessary for the particular bacterial culture, which is to be used, to survive. The UBR tower 14 is then innoculated with a small supply of recycled waste water containing the dominant bacteria strain required to interact with the organic contaminants identified in the waste water, as well as with new liquid bacteria as provided through the valve piping system 106 from the main fermenters 18 and 20. Additionally, necessary nutrients are supplied by the nutrient supply tank 22 via pump 74 and piping 76, through oxygenator 28 into the UBR.

Once the bacteria are acclimated, and begin to multiply in the UBR tower 14, valves 94 and 96 can then be opened and the waste water and air directed to the unique distribution system 108.

The distribution system 108 comprises a plurality of channel members, 110, 112, 114, 116, 118. Each of these channel members are secured to the base 98 of the UBR tower 14 by leveling means typically shown as 120 in FIG. 5.

Disposed beneath each channel member and coextending horizontally the length of each channel member are a first group of pipes, 120, 122, 124, 126, 128 and 130. A second group of pipes, 132 and 134 connect inlet pipes 95 and 97 to corresponding members of the first group of pipes. So, for example, pipe 132 connects inlet pipe 95 to pipes 120, 122, and 124, while pipe 134 connects inlet pipe 97 to pipes 126, 128, and 130.

Figure 6:
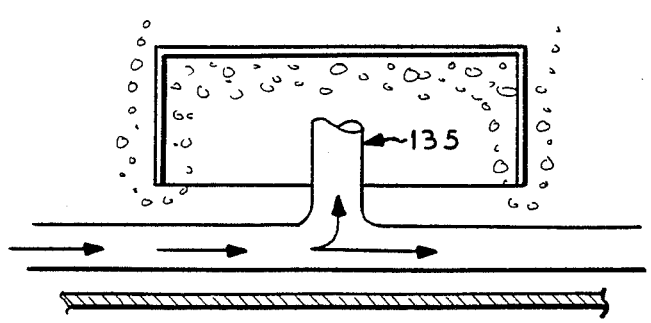
FIG. 6 is a further elevational view of the feature depicted in FIG. 3.
Figure 5:
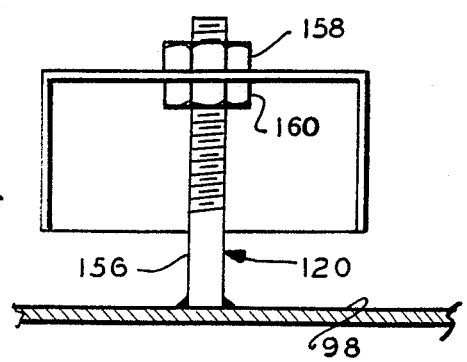
FIG. 5 is a detailed, elevational view of the feature depicted in FIG. 4.

The first group of pipes coextensive with each channel member include orifice pipes (shown typically as 135 in FIG. 6). Each said orifice pipe extends upwards and are located typically, at least, at the extremes of each pipe member of the first group of pipes, i.e., 120, 122, 124, 126, 128 and 130, at locations 136, 138, 140, 142, 144, 146, 148, 150, 152 and 154.

Figure 3:
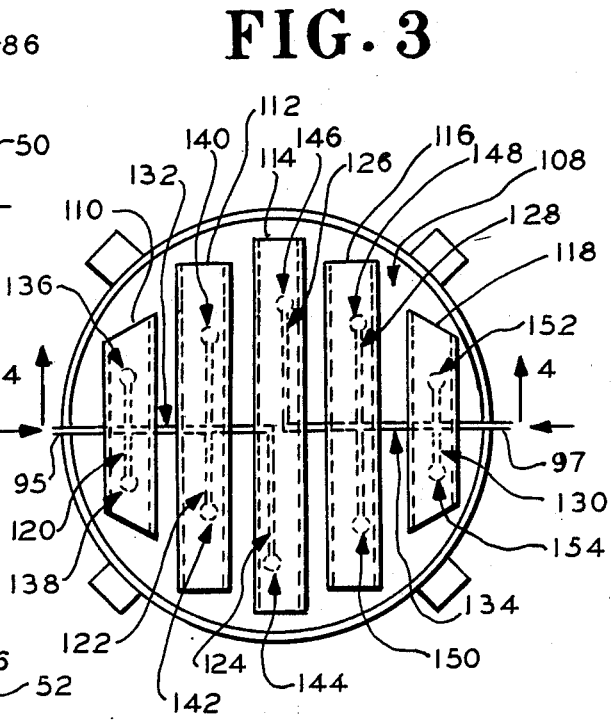
FIG. 3 is a plan view taken along lines 3—3 of FIG. 1.
Figure 4:
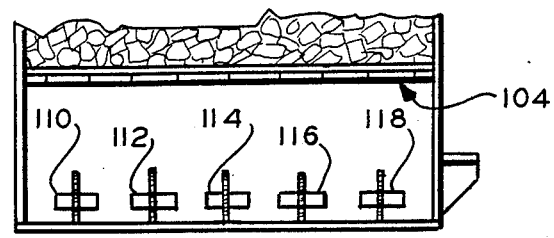
FIG. 4 is a partial, elevational view in section showing a feature of the improved treatment system; taken along lines 4—4 of FIG. 3.

Channel members 112, 114 and 116 are rectangular, box-shaped, closed on five sides with the open side facing the bottom of the tower. Channels 110 and 118 are also closed box-shaped with the open side facing the bottom of the tower, but, in the plan view such as depicted in FIG. 3, are trapezoidal due to the tapering of the ends because of the curvature of the tower.

Leveling means 120 include typically, a threaded stud member 156, which extends vertically upward in relation to the tower base 98. The stud is secured to the base by welding. There are two such leveling means for each channel member. The channel member is precisely drilled to fit over the studs. Nuts 158 and 160 are placed on either side of the top side of the channel member. After each channel member is leveled, using a sight level, the nuts 158 and 160 are secured snugly against the top channel side to hold the channel member in its level, horizontal position.

Once the channel members have been leveled and the tower inoculated with the suitable bacteria culture, the UBR is ready to receive the waste water from the oxygenator 28.

The entrained air/mist waste water received from the oxygenator 28 is distributed via pipes 132 and 134 to the pipes 120, 122, 124, 126, 128, and 130. In turn, the entrained air/mist waste water bubbles out of the orifice openings, such as 135, which are positioned in the cavity formed by the five-sided channels. Initially, the bubbling waste water is trapped in the cavity until it works its way down along the vertically extending sides and spills over the bottom edge of each side to make its ascent up through the biomass formed on the packing above the screen 104.

This unique design evenly delivers the waste water and air/mist to the entire cross-sectional area of the UBR tower 14. Further, as a result of this clean and straight-forward design common crystallization and solidification of the waste which heretofore has clogged other distribution systems is avoided. Thus the attending consequence of the development of starved areas of the biomass resulting in an anaerobic condition, with attending foul odors is also avoided.

The piping comprising the first and second groups identified above, as well as the orifice pipes, are of one inch galvanized steel pipe and thus, being considerably larger than sparger distribution type pipes heretofore used, are free from any clogging concerns.

Returning to FIG. 1, and referring particularly to the UBR tower 14, the cut-away section at the top of the tower reveals the top surface 162 of the waste water. Connected approximately at the level of the top surface is a piping system 164 which is used to drain off the treated waste after the biological reactive process is complete.

The piping system 164 includes a double drain connection 166 and 168 which tap into the sides of the tower at the level of the top surface 162; and meet at a tee connection 170. The drained liquid enters the effluent tank 16 through piping 176 which in turn is connected to a trap, 178, positioned in the tank 16. Opening 180 of the upward extending member 181 of the trap is positioned near the top of the effluent tank. Liquid from the UBR tower 14 exits the piping system 164 at the top opening 180 rising eventually to a level 182.

This trap is sized to develop a pressure head on the air/foam release system (described hereinafter) to allow the air/foam being discharged through the sparger pipe (identified as 192 hereinafter) to overcome the static head between the discharge point and the surface of the liquid in the tank.

A further piping system 184 is used as an air/foam release system to vent the volume 186 formed above the top surface of the waste water 162. Collected in this area is an air/foam mixture which is a resultant effect of the UBR tower 14 process. The air in this area still retains a level of oxygen. Heretofore, this area of the UBR tower 14 would be vented directly to the outside and the potential benefits of the remaining oxygen lost. Further, in prior art systems, the foam that would collect in this area would be routed to a separate condensing system.

In the present invention, the piping system 184 includes a pipe section 188 which is attached to the top of the UBR tower which vents the pressurized air/foam content in the volume 186 into the piping system 184.

System 184 includes a connecting pipe member 190 which enters the effluent tank 16 and is terminated near the bottom of the tank in a sparger pipe 192.

Here, the air/foam mixture is bubbled up through the treated effluent. The oxygen which remains in the vented air combines with the bacteria culture which is also present in the treated waste, to provide a "polishing" of the treated waste, eliminating still further organic contaminants.

Further, the bubbling of the air and foam through the treated waste inhibits the formation of anaerobic conditions in he treated waste, thus avoiding or minimizing any foul odors from developing.

The top of the effluent tank includes a manhole cover not detailed, through which piping systems 164 and 184 pass. During servicing, this manhole permits access to the piping in the tank 16, including the sparger pipe 192, to permit replacement or cleaning.

While the disclosure has emphasized that the organic contaminants are successfully eliminated by UBR's generally, as well as the particular system disclosed herein, it is to be understood that UBR's, including the present design can be used to eliminate certain inorganic contaminants as well. For example, bacteria consume ammonia and phosphate compounds and thus these UBR towers would be successful as well in eliminating these.

After a reading of the above, it should be apparent to those skilled in the art, that alternatives in the construction of the improvements to the system including the oxygenator, the UBR distribution system, and the effluent "polishing" system will be apparent. It is further to be understood that the scope of the invention is not to be limited to the described embodiment but rather defined by the breadth of the claims which follow.

What is claimed is:

1. In a waste treatment system including an influent waste tank for preconditioning waste liquid which contains organic or inorganic wastes, an upflow biological reactor tower (UBR), adapted to receive said preconditioned waste liquid, for biological reduction of the wastes contained in said preconditioned waste liquid, said UBR having a base and tower portion of predetermined height and cross-sectional area, filled with packing media to which are affixed suitable bacterial cultures selected specifically to accomplish the biological reduction of the particular wastes contained in said waste liquid, and an effluent waste tank for temporary storage of the liquid treated waste received from said UBR wherein the improvement comprises:
   (a) a separate vessel means for enriching preconditioned waste liquid with dissolved oxygen, said enriched, preconditioned waste liquid thereafter supplied to said UBR, whereby enhancement of any remaining biodegradation of wastes in said UBR is accomplished; and,
   (b) means for evenly distributing the dissolved oxygen enriched, preconditioned waste liquid in said UBR, including,
      (i) a plurality of channel means, each having one open side,
      (ii) leveling means for fixedly connecting each of said channel means to the base of the UBR, the open side of each channel means disposed facing downward toward the base of said UBR,
      (iii) a plurality of first pipe means disposed beneath said channel means, said first pipe means including a number of orifices opening towards the open side of the corresponding channel means,
   said first pipe means adapted to receive said dissolved oxygen-enriched, preconditioned waste liquid from said separate vessel means,
   whereby the dissolved oxygen enriched, preconditioned waste liquid received at the UBR is dispensed from the first pipe means via said orifices,
   said leveling means including adjusting means for adjusting the horizontal orientation of each of said channel means such that even distribution, across the cross-sectional area of the UBR, of the oxygen enriched, preconditioned waste water exiting from the orifices is achieved.

2. The improved system claimed in claim 1 wherein the UBR includes a volume at the top of the tower portion wherein compressed air, oxygen and foam are collected as they exit from the waste liquid contained in the UBR, said improved system further comprising:
   (a) outlet pipe means for piping the compressed air, oxygen and foam in said volume into the effluent waste tank;
   (b) sparger pipe means positioned near the bottom of the effluent waste tank, said sparger pipe means communicatively connected to said outlet pipe means,
   whereby the air, oxygen and foam are discharged into the liquid treated waste from said sparger pipe means such that the development of an anaerobic condition in the liquid treated waste is inhibited, further biodegradation of the waste is achieved and the foam is condensed.

3. The improved system claimed in either claim 1 or claim 2 wherein said separate vessel means comprises:
   (a) a container member having a side and bottom portion;
   (b) a screen member secured to the side of said container member;
   (c) column packing material disposed in said container member, and above said screen member;
   (d) first entrance pipe means secured in the side of the container member near the top thereof;
   (e) a second entrance pipe means secured on the side of the container near the bottom thereof;
   (f) an exit pipe means secured in the side of the container between the bottom and top thereof;
   wherein said preconditioned waste liquid enters said separate vessel through said first entrance pipe means then trickles down over said column packing material and through said screen member, collecting at the bottom portion of said container member, said second entrance pipe directing pressurized air towards the bottom portion of the container whereby said collected preconditioned waste is blown back up through said screen and column packing material, whereby said preconditioned waste liquid is enriched with dissolved oxygen, said exit pipe means collecting and carrying the enriched preconditioned waste liquid to said UBR.

4. In a waste water treatment system including an influent waste tank for preconditioning waste liquid which contains organic or inorganic wastes, an upflow biological reactor tower (UBR), adapted to receive said preconditioned waste liquid, for biological reduction of the wastes contained in said preconditioned waste liquid, said UBR having a base and tower portion of predetermined height and cross-sectional area, filled with packing media to which are affixed suitable bacterial cultures selected specifically to accomplish the biological reduction of the particular wastes contained in said waste liquid, and an effluent waste tank for temporary storage of the liquid treated waste received from said UBR wherein the improvement comprises:

(a) a separate vessel means for enriching preconditioned waste liquid with dissolved oxygen, said enriched, preconditioned waste liquid thereafter supplied to said UBR, whereby enhancement of any remaining biodegradation of wastes in said UBR is accomplished;

said UBR including a volume at the top of the tower portion wherein compressed air, oxygen, and foam are collected as they exit from the waste liquid contained in the UBR;

(b) outlet pipe means for piping the compressed air, oxygen and foam in said volume into the effluent waste tank; and, (c) sparger pipe means positioned near the bottom of the effluent waste tank said sparger pipe means communicatively connected to said outlet pipe means, whereby the air, oxygen and foam are discharged into the liquid treated waste from said sparger pipe means such that the development of an anaerobic condition in the liquid treated waste is inhibited, further biodegradation of the waste is achieved and the foam is condensed.

5. In a waste water treatment system including an influent waste tank for preconditioning waste liquid which contains organic or inorganic wastes, an upflow biological reactor tower (UBR), adapted to receive said preconditioned waste liquid, for biological reduction of the wastes contained in said preconditioned waste liquid, said UBR having a base and tower portion of predetermined height and cross-sectional area, filled with packing media to which are affixed suitable bacterial cultures selected specifically to accomplish the biological reduction of the particular wastes contained in said waste liquid, and an effluent waste tank for temporary storage of the liquid treated waste received from said UBR wherein the improvement comprises:

a separate vessel means for enriching preconditioned waste liquid with dissolved oxygen, said enriched, preconditioned waste liquid thereafter supplied to said UBR, whereby enhancement of any remaining biodegradation of wastes in said UBR is accomplished, said separate vessel means including, (a) a container member having a side and bottom portion;

(b) a screen member secured to the side of said container portion;

(c) column packing material disposed in said container member, and above said screen member;

(d) first entrance pipe means secured in the side of the container member near the top thereof;

(e) a second entrance pipe means secured on the side of the container near the bottom thereof;

(f) an exit pipe means secured in the side of the container between the bottom and top thereof;

wherein said preconditioned waste liquid enters said separate vessel through said first entrance pipe means then trickles down over said column packing material and through said screen member, collecting at the bottom portion of said container member, said second entrance pipe directing pressurized oxygen containing gas towards the bottom portion of the container whereby said collected preconditioned waste is blown back up through said screen and column packing material, whereby said preconditioned waste liquid is enriched with dissolved oxygen, said exit pipe means collecting and carrying the enriched preconditioned waste liquid to said UBR.

* * * * *

UNITED STATES PATENT AND TRADEMARK OFFICE
CERTIFICATE OF CORRECTION

PATENT NO. : 4,921,604

DATED : May 1, 1990

INVENTOR(S) : Albert J. Mollenbeck

It is certified that error appears in the above-identified patent and that said Letters Patent is hereby corrected as shown below:

On the title page, in the Title, change "REATOR" to --REACTOR--.

In the Title at column 1, line 2, change "REATOR" to --REACTOR--.

Signed and Sealed this

Seventeenth Day of March, 1992

Attest:

HARRY F. MANBECK, JR.

*Attesting Officer*  *Commissioner of Patents and Trademarks*